US012747966B2

(12) United States Patent
Wakabayashi

(10) Patent No.: US 12,747,966 B2
(45) Date of Patent: Sep. 29, 2026

(54) DISPLACEMENT DETECTION DEVICE

(71) Applicant: FANUC CORPORATION, Yamanashi (JP)

(72) Inventor: Kazuki Wakabayashi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 204 days.

(21) Appl. No.: 18/715,159

(22) PCT Filed: Dec. 7, 2021

(86) PCT No.: PCT/JP2021/044987
§ 371 (c)(1),
(2) Date: May 31, 2024

(87) PCT Pub. No.: WO2023/105643
PCT Pub. Date: Jun. 15, 2023

(65) Prior Publication Data
US 2025/0027793 A1 Jan. 23, 2025

(51) Int. Cl.
*G01B 7/14* (2006.01)
*G01D 5/241* (2006.01)

(52) U.S. Cl.
CPC .................................. *G01D 5/2417* (2013.01)

(58) Field of Classification Search
CPC .................................. G01D 5/247; G01B 7/14
See application file for complete search history.

(56) References Cited

U.S. PATENT DOCUMENTS 4,098,000 A * 7/1978 Egger .................. G01D 5/2417 33/788
4,801,897 A * 1/1989 Flecken ................ G01F 1/8495 73/861.357

(Continued)

FOREIGN PATENT DOCUMENTS

JP H05322671 A 12/1993
JP 2002529684 A 9/2002

(Continued)

OTHER PUBLICATIONS

International Search Report issued by the Japan Patent Office acting as the International Searching Authority in relation to International Application No. PCT/JP2021/044987 dated Mar. 1, 2022 (3 pages) along with English language translation (2 pages).

(Continued)

*Primary Examiner* — Dominic E Hawkins
(74) *Attorney, Agent, or Firm* — Carter, DeLuca & Farrell, LLP; Francesco Sardone

(57) ABSTRACT

A displacement detection device includes a first plate member and a second plate member that extend in a predetermined direction; and a sensor that detects displacement. Opposite ends of the first plate member are respectively connected to opposite ends of the second plate member. Each of the first and second plate members has a first end portion and a second end portion, and also has a middle portion located between these two end portions. A gap is formed between the middle portion of the first plate member and the middle portion of the second plate member. The sensor detects variation in the gap. When a second member is displaced in the predetermined direction, the amount of variation in the gap is greater than the amount of displacement of the second member.

10 Claims, 10 Drawing Sheets

(56) References Cited

U.S. PATENT DOCUMENTS

| | | | | |
|---|---|---|---|---|
| 6,880,408 | B1 * | 4/2005 | Madden | G01L 1/127<br>73/782 |
| 9,719,826 | B2 * | 8/2017 | Fan | G01F 1/8409 |
| 11,815,416 | B2 * | 11/2023 | Wakabayashi | G01L 1/142 |
| 2010/0219842 | A1 * | 9/2010 | Gianetti | G01L 1/144<br>324/662 |
| 2018/0017369 | A1 * | 1/2018 | Yoshiya | G01B 7/023 |
| 2018/0038898 | A1 * | 2/2018 | Shimizu | G01R 15/20 |

FOREIGN PATENT DOCUMENTS

| | | | |
|---|---|---|---|
| JP | 2006177822 | A | 7/2006 |
| JP | 2019174477 | A | 10/2019 |
| TW | 201823699 | A | 7/2018 |

OTHER PUBLICATIONS

Written Opinion of the International Seaching Authority issued by the Japan Patent Office acting as the International Searching Authority in relation to International Application No. PCT/JP2021/044987 dated Mar. 1, 2022 (3 pages).

Office Action dated Dec. 3, 2025 issued in corresponding Taiwanese Patent Application No. 111146654 (4 pages).

* cited by examiner

DISPLACEMENT DETECTION DEVICE

CROSS-REFERENCE TO RELATED APPLICATIONS

This application is a national phase entry under 35 U.S.C. 371 of PCT International Application No. PCT/JP2021/044987, filed Dec. 7, 2021, the disclosure of this application is expressly incorporated herein by reference in its entirety.

TECHNICAL FIELD

The present invention relates to a displacement detection device that detects displacement of a second member relative to a first member in a predetermined direction.

BACKGROUND ART

A movable shaft portion of a collaborative robot is provided with a torque sensor for detecting torque. The provision of the torque sensor allows the collaborative robot to have a contact stop function. In addition, by providing the torque sensor, the collaborative robot can achieve operation of the robot by direct teaching (also referred to as "lead-through").

Some torque sensors use a displacement detection device (displacement sensor). For example, JP 2019-174477 A discloses a torque sensor using a displacement detection device. The displacement detection device detects displacement of a second member relative to a first member.

SUMMARY OF THE INVENTION

In order to accurately control the collaborative robot or the like, it is preferable that the displacement detection device has high sensitivity. Therefore, a technique for increasing the sensitivity of the displacement detection device has been studied.

The present invention has the object of solving the aforementioned problem.

According to an aspect of the present invention, there is provided a displacement detection device for detecting displacement of a second member relative to a first member in a predetermined direction, the displacement detection device including: a first plate member configured to extend in the predetermined direction; a second plate member configured to extend in the predetermined direction; and a sensor configured to detect displacement, wherein both end portions of the first plate member and both end portions of the second plate member are connected to each other, each of the first plate member and the second plate member includes, as both the end portions, a first end portion attached to the first member and a second end portion attached to the second member, and further includes an intermediate portion interposed between both the end portions, a gap is formed between the intermediate portion of the first plate member and the intermediate portion of the second plate member, the sensor detects a change in the gap, and when the second member is displaced in the predetermined direction, an amount of the change in the gap is larger than an amount of displacement of the second member.

According to the present invention, the sensitivity of the displacement detection device can be increased.

DETAILED DESCRIPTION OF THE INVENTION

1. First Embodiment

[1-1. Configuration of Displacement Detection Device 10]

Figure 1:
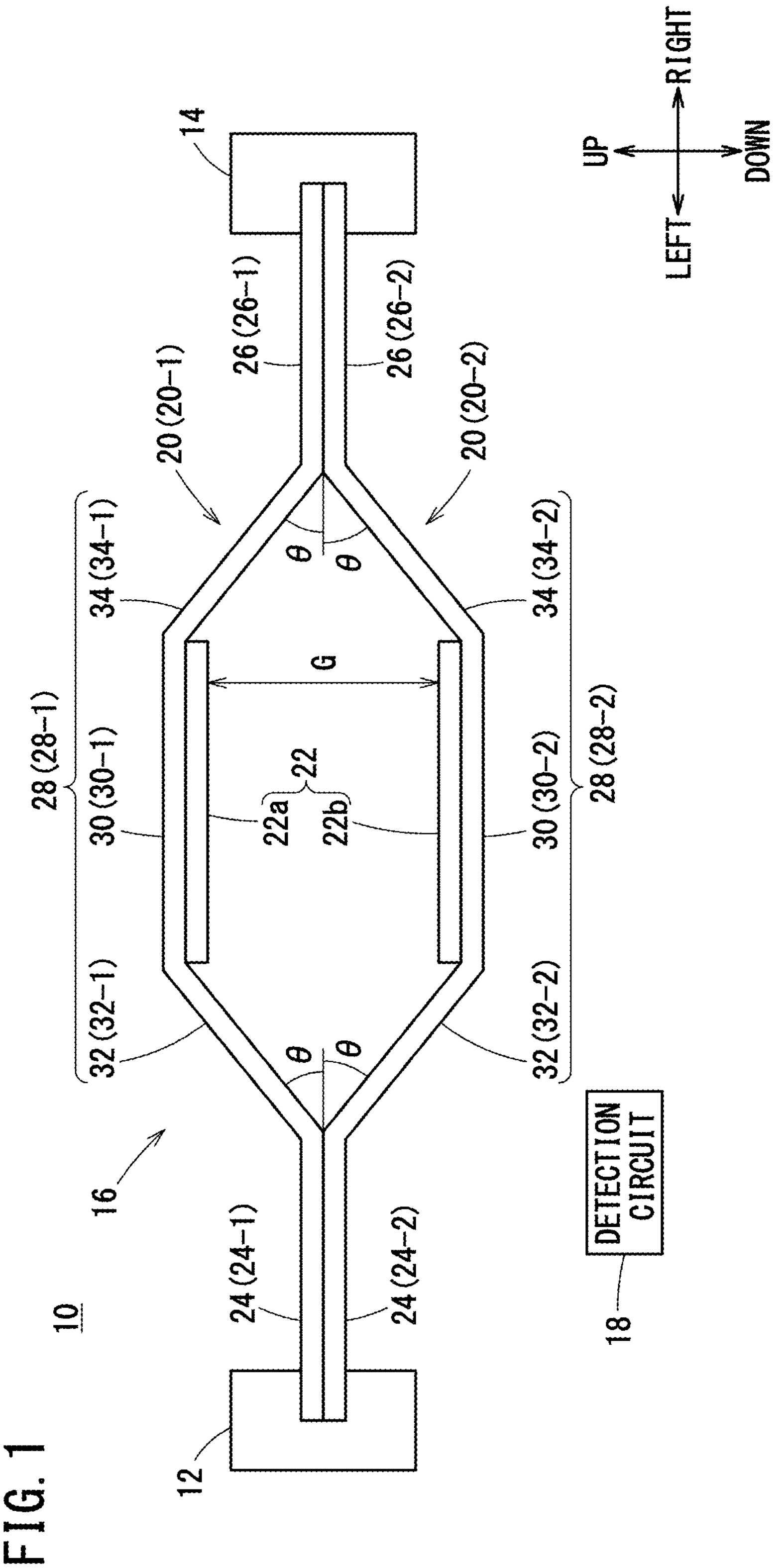
FIG. 1 is a configuration diagram of a displacement detection device of a first embodiment.
Figure 2:
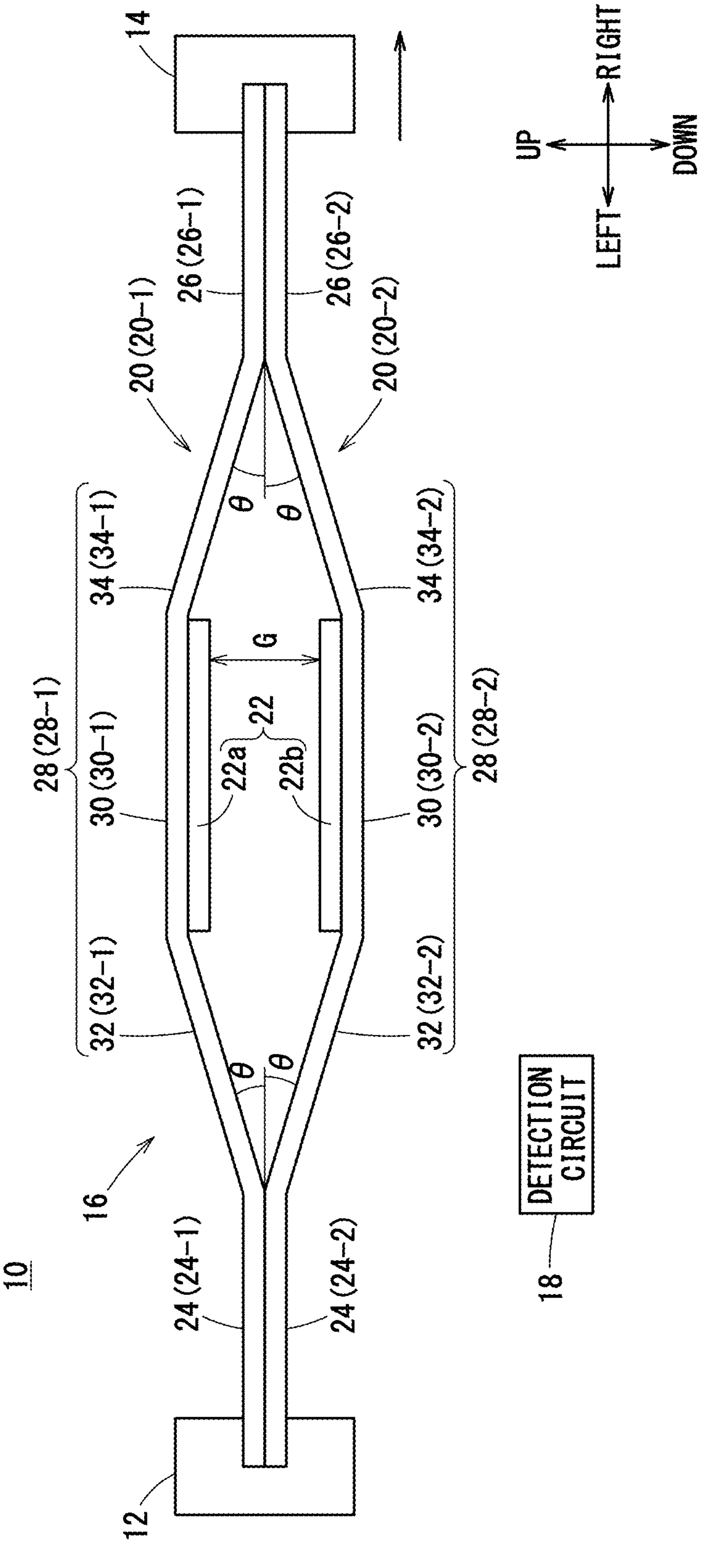
FIG. 2 is a configuration diagram of a displacement detection device of the first embodiment.

A displacement detection device 10 of a first embodiment will be described with reference to FIGS. 1 and 2. FIGS. 1 and 2 are configuration diagrams of the displacement detection device 10 of the first embodiment. FIG. 1 shows the displacement detection device 10 in a state where no external force is applied to a first member 12 and a second member 14. FIG. 2 shows the displacement detection device 10 in a state where external force in a predetermined direction is applied to the second member 14. The displacement detection device 10 is attached to the first member 12 and the second member 14. The displacement detection device 10 detects displacement of the second member 14 relative to the first member 12 in a predetermined direction. In the present specification, the configuration, operation, and the like of the displacement detection device 10 will be described using the expressions "up", "down", "left", and "right" for convenience. However, the configuration, operation, and the like of the displacement detection device 10 are not limited to a specific direction.

The displacement detection device 10 includes a detection unit 16 and a detection circuit 18. The detection unit 16 includes two plate members 20 (a first plate member 20-1 and a second plate member 20-2) and a sensor 22. In the following description, a configuration denoted by a reference sign "x-1" (x is a number) is a configuration of the first plate member 20-1. Similarly, a configuration denoted by a reference sign "x-2" (x is a number) is a configuration of the second plate member 20-2. Further, of the surfaces of each plate member 20, a surface facing in a direction in which an intermediate portion 28 protrudes is referred to as a first surface, and a surface opposite to the first surface is referred to as a second surface.

Each plate member 20 is formed by pressing a metal flat plate that is long in the left-right direction. Each plate member 20 has a first end portion 24, a second end portion 26 and an intermediate portion 28. The shape of the first plate member 20-1 and the shape of the second plate member 20-2 are the same as each other. Each plate member 20 is configured to extend in the left-right direction. In the first plate member 20-1, the first end portion 24-1 and the second end portion 26-1 extend in the left-right direction, and the intermediate portion 28-1 projects in an upward direction orthogonal to the left-right direction. In the second plate member 20-2, the first end portion 24-2 and the second end portion 26-2 extend in the left-right direction, and the intermediate portion 28-2 projects in a downward direction orthogonal to the left-right direction.

The first end portion 24 (24-1, 24-2) includes the left end of the plate member 20. The second end portion 26 (26-1, 26-2) includes the right end of the plate member 20. The first end portion 24 and the second end portion 26 are parallel to the left-right direction. The first end portion 24-1 and the second end portion 26-1 are located at the lowermost position in the first plate member 20-1. The first end portion 24-2 and the second end portion 26-2 are located at the uppermost position in the second plate member 20-2. The second surface (lower surface) of the first end portion 24-1 and the second surface (upper surface) of the first end portion 24-2 are connected to each other by an adhesive, welding, or the like. Similarly, the second surface (lower surface) of the second end portion 26-1 and the second surface (upper surface) of the second end portion 26-2 are connected to each other by an adhesive, welding, or the like. At least one of the first end portion 24-1 or the first end portion 24-2 is attached to the first member 12. At least one of the second end portion 26-1 or the second end portion 26-2 is attached to the second member 14.

The intermediate portion 28 (28-1, 28-2) is positioned between the first end portion 24 and the second end portion 26. The intermediate portion 28 is connected to the first end portion 24 and the second end portion 26. Further, each intermediate portion 28 has a holding portion 30, a first inclined portion 32 and a second inclined portion 34. Each of the holding portions 30 holds the sensor 22. The holding portions 30 are parallel to the left-right direction. The holding portion 30-1 is positioned at the uppermost position in the first plate member 20-1. The holding portion 30-2 is positioned at the lowest position in the second plate member 20-2. The holding portion 30-1 is positioned above the holding portion 30-2. The holding portion 30-1 and the holding portion 30-2 are separated from each other. The first inclined portion 32 is located between the holding portion 30 and the first end portion 24 and is connected to the holding portion 30 and the first end portion 24. The second inclined portion 34 is located between the holding portion 30 and the second end portion 26, and is connected to the holding portion 30 and the second end portion 26. The first inclined portion 32 and the second inclined portion 34 are inclined at an inclination angle θ with respect to the left-right direction. The inclination direction of the first inclined portion 32 and the inclination direction of the second inclined portion 34 are opposite to each other. The initial value of the inclination angle θ is less than 45 degrees. The initial value of the inclination angle θ is an angle obtained in a case where no external force acts on the first member 12 and the second member 14.

The plate member 20 protrudes in the up-down direction by being bent at four places. That is, the plate member 20 bends at the boundary between the first end portion 24 and the first inclined portion 32 and the boundary between the second end portion 26 and the second inclined portion 34. Further, the plate member 20 is bent at the boundary between the first inclined portion 32 and the holding portion 30 and the boundary between the second inclined portion 34 and the holding portion 30. Alternatively, the plate member 20 may protrude in the up-down direction by being curved.

The sensor 22 is a capacitive sensor whose capacitance value changes in accordance with a change in distance between a pair of opposing electrodes 22*a* and 22*b*. One electrode 22*a* of the opposing electrodes is attached to the second surface (lower surface) of the holding portion 30-1. The opposing electrode 22*a* and the holding portion 30-1 are insulated from each other. The other electrode 22*b* of the opposing electrodes is attached to the second surface (upper surface) of the holding portion 30-2. The opposing electrode 22*b* and the holding portion 30-2 are insulated from each other. A gap G is formed between the opposing electrodes 22*a* and 22*b*. The gap G can widen and narrow in the up-down direction in accordance with the displacement of the second member 14 relative to the first member 12 in the left-right direction.

The sensor 22 may not be a capacitive sensor. For example, the sensor 22 may include a strain gauge. The sensor 22 may include a piezoelectric element.

The detection circuit 18 is connected to the opposing electrodes 22*a* and 22*b* by conductive wires (not shown). The detection circuit 18 applies a predetermined voltage between the pair of opposing electrodes 22*a* and 22*b*, and detects the capacitance value of the pair of opposing electrodes 22*a* and 22*b*. The detection value of the detection circuit 18 is output to an arithmetic device (not shown) such as a computer. The arithmetic device stores a table or an arithmetic equation in advance. The table or the arithmetic equation associates the change amount of the capacitance value with the displacement amount of the second member 14 relative to the first member 12 in the predetermined direction (left-right direction). In addition, the table or the arithmetic equation associates the change amount of the capacitance value with the external force acting in the predetermined direction (left-right direction).

[1-2. Operation of Displacement Detection Device 10]

When an external force pulling the second member 14 in the right direction acts on the second member 14, the displacement detection device 10 changes from the state shown in FIG. 1 to the state shown in FIG. 2. When the second member 14 is displaced in the right direction, each of the second end portions 26 is displaced in the right direction. As each of the second end portions 26 is displaced in the right direction, each of the plate members 20 is elastically deformed, and the inclination angle θ of the first inclined portion 32 and the inclination angle θ of the second inclined portion 34 are decreased. When the inclination angle θ of the first inclined portion 32-1 and the inclination angle θ of the second inclined portion 34-1 are decreased, the holding portion 30-1 is displaced downward. When the inclination angle θ of the first inclined portion 32-2 and the inclination angle θ of the second inclined portion 34-2 are decreased, the holding portion 30-2 is displaced upward. Then, the holding portion 30-1 and the holding portion 30-2 approach each other, and accordingly the opposing electrodes 22*a* and 22*b* approach each other. As a result, the gap G is narrowed.

On the other hand, when the second member 14 is displaced in the left direction, each second end portion 26 is displaced in the left direction. As the second end portion 26 is displaced leftward, each plate member 20 is elastically deformed, and the inclination angle θ of the first inclined portion 32 and the inclination angle θ of the second inclined portion 34 are increased. When the inclination angle θ of the first inclined portion 32-1 and the inclination angle θ of the second inclined portion 34-1 are increased, the holding portion 30-1 is displaced upward. When the inclination angle θ of the first inclined portion 32-2 and the inclination angle θ of the second inclined portion 34-2 are increased, the holding portion 30-2 is displaced downward. Then, the holding portion 30-1 and the holding portion 30-2 move away from each other, and accordingly the opposing electrodes 22*a* and 22*b* move away from each other. As a result, the gap G is widened.

Note that the first member 12 may be displaced in the left-right direction with respect to the second member 14 instead of the second member 14 being displaced in the left-right direction with respect to the first member 12.

The arithmetic device calculates the displacement amount of the second member 14 relative to the first member 12 and the external force acting in the displacement direction, based on the capacitance value detected by the detection circuit 18, the table stored in advance, and the like.

[1-3. Operation and Effect of Displacement Detection Device 10]

In the first embodiment, the operation of displacing the second member 14 in the left-right direction with respect to the first member 12 is converted into the operation of changing (widening/narrowing) the gap G. The direction in which the gap G is changed (the up-down direction) is orthogonal to the direction in which the second member 14 is displaced (the left-right direction). Each plate member 20 amplifies the amount of displacement of the second member 14 and transmits the amplified amount to the sensor 22.

In the first embodiment, the initial value of the inclination angle θ of the first inclined portion 32 and the initial value of the inclination angle θ of the second inclined portion 34 are less than 45 degrees. Therefore, the amount of change in the gap G when the second member 14 is displaced to the left or right is larger than the amount of displacement of the second member 14. In the first embodiment, both the opposing electrodes 22*a* and 22*b* are displaced in accordance with the displacement of the second member 14. Therefore, the amount of change in the gap G is further increased. The fact that the amount of change in the gap G is larger than the amount of displacement of the second member 14 means that the sensitivity of detecting the displacement increases. That is, according to the first embodiment, the sensitivity of detecting the displacement of the second member 14 can be increased.

In the first embodiment, the second surfaces of the two plate members 20 are connected to each other. This makes it possible to reduce the initial value (initial distance) of the gap G. A small initial value of the gap G means that the sensitivity of the displacement detection is high. According to the first embodiment, the sensitivity of detecting the displacement of the second member 14 can be increased also in this respect.

2. Second Embodiment

Figure 3:
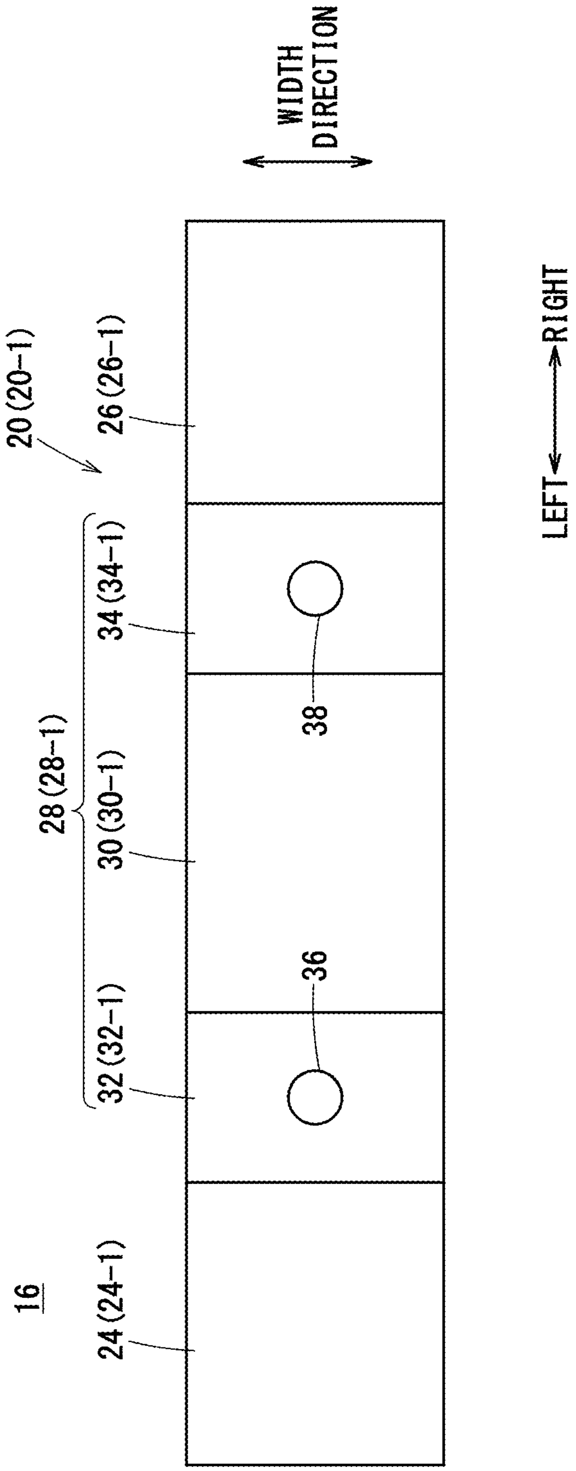
FIG. 3 is a top view of a detection unit of a second embodiment.
Figure 4:
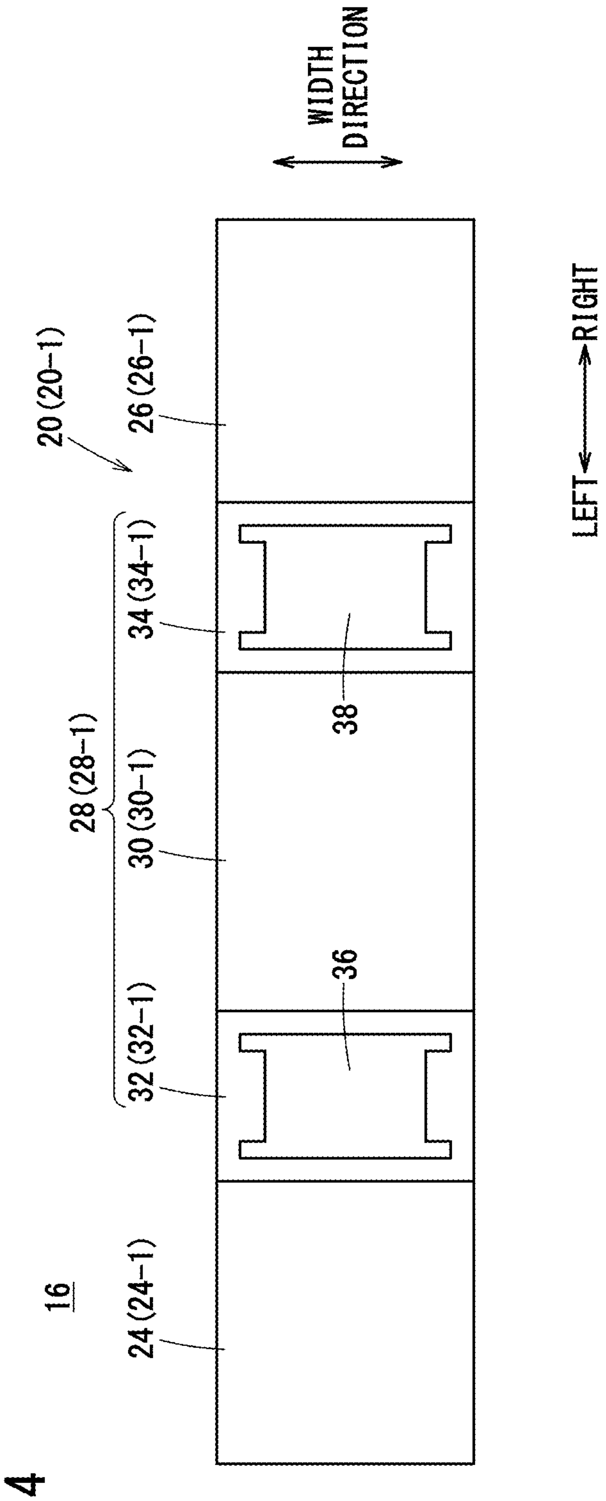
FIG. 4 is a top view of a detection unit according to a modification of the second embodiment.

A displacement detection device 10 of a second embodiment will be described with reference to FIGS. 3 and 4. FIG. 3 is a top view of a detection unit 16 of the second embodiment. FIG. 4 is a top view of the detection unit 16 according to a modification of the second embodiment. The displacement detection device 10 of the second embodiment is an improved example of the displacement detection device 10 of the first embodiment. The displacement detection device 10 of the second embodiment includes all the constituent elements of the displacement detection device 10 of the first embodiment. The operation of the displacement detection device 10 of the second embodiment is basically the same as the operation of the displacement detection device 10 of the first embodiment. In the description of the second embodiment, the same components as those of the first embodiment are denoted by the same reference numerals, and the description thereof will be omitted.

The second member 14 shown in FIG. 1 and the like can be displaced in the width direction of each plate member 20. The width direction is orthogonal to the left-right direction and the up-down direction. When the displacement amount of the second member 14 in the width direction increases, the gap G may fluctuate. The second embodiment prevents the displacement of the second member 14 in the width direction from being converted into the fluctuation in the gap G.

[2-1. Configuration of Displacement Detection Device 10]

In the second embodiment, a first hole 36 is formed in the first inclined portion 32 so as to penetrate therethrough in the up-down direction. The shape of the first hole 36 is not particularly limited. The shape of the first hole 36 may be, for example, a perfect circle, an ellipse, a polygon, or an elongated hole. As shown in FIG. 4, the shape of the first hole 36 may be irregular. The position of the first hole 36 is not particularly limited. The number of the first hole 36 may be one or more. The first hole 36 may be disposed near the first end portion 24 or near the holding portion 30. The first hole 36 may be formed from the first end portion 24 to the holding portion 30.

Similarly to the first inclined portion 32, a second hole 38 is formed in the second inclined portion 34 so as to penetrate therethrough in the up-down direction. The shape, the number, the position, and the like of the second hole 38 are the same as the shape, the number, the position, and the like of the first hole 36.

Although FIG. 3 shows the configuration of the first plate member 20-1, the configuration of the second plate member 20-2 is also the same as the configuration of the first plate member 20-1.

[2-2. Operation and Effect of Displacement Detection Device 10]

The first inclined portion 32 and the second inclined portion 34 having holes are more easily deformed in the width direction than the first inclined portion 32 and the second inclined portion 34 having no holes. That is, in the second embodiment, the first inclined portion 32 and the second inclined portion 34 have flexibility. According to the second embodiment, even when the amount of displacement of the second member 14 in the width direction increases, the first inclined portion 32 and the second inclined portion 34 can be flexibly deformed in the width direction. Therefore, the fluctuation in the gap G caused by the displacement of the second member 14 in the width direction is prevented. That is, erroneous detection of the displacement detection device 10 due to displacement of the second member 14 in the width direction is prevented.

3. Third Embodiment

Figure 5:
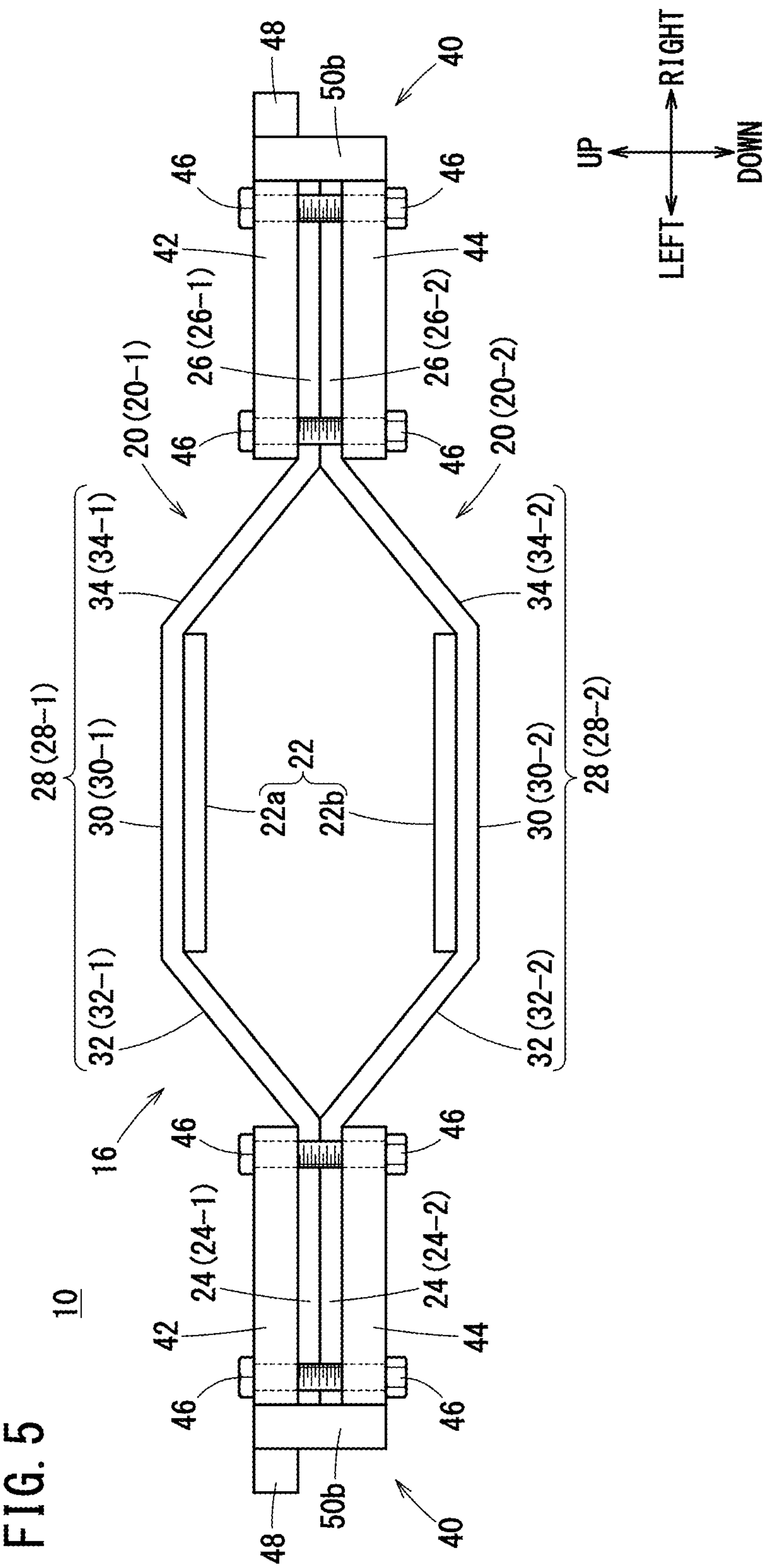
FIG. 5 is a front view of a detection unit according to a third embodiment.
Figure 6:
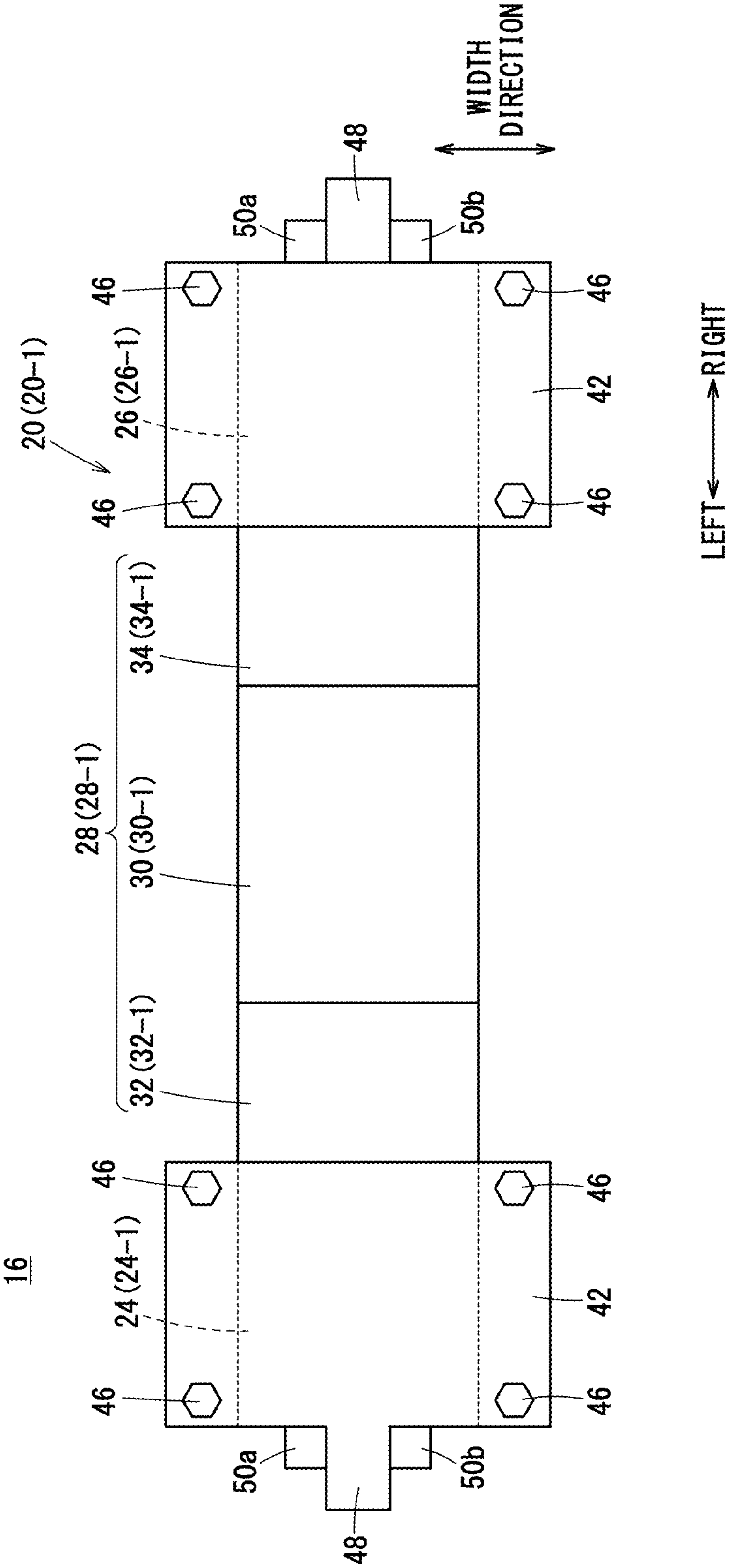
FIG. 6 is a top view of the detection unit according to the third embodiment.
Figure 7:
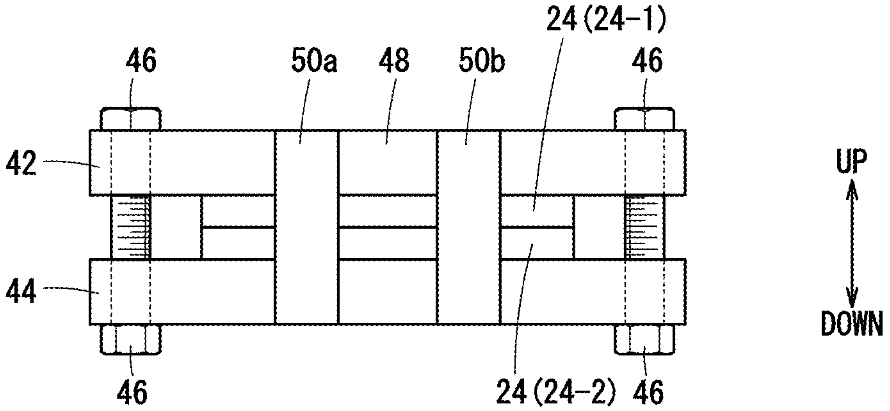
FIG. 7 is a left side view of the detection unit according to the third embodiment.

The displacement detection device 10 of a third embodiment will be described with reference to FIGS. 5 to 7. FIG. 5 is a front view of a detection unit 16 of the third embodiment. FIG. 6 is a top view of the detection unit 16 of the third embodiment. FIG. 7 is a left side view of the detection unit 16 of the third embodiment. The displacement detection device 10 of the third embodiment is an improved example of the displacement detection device 10 of the first embodiment. The displacement detection device 10 of the third embodiment includes all the constituent elements of the displacement detection device 10 of the first embodiment. The operation of the displacement detection device 10 of the third embodiment is basically the same as the operation of the displacement detection device 10 of the first embodiment. In the description of the third embodiment, the same components as those of the first embodiment are denoted by the same reference numerals, and the description thereof will be omitted.

In the first embodiment, when the inclination angle θ of the first inclined portion 32-1 becomes larger than the initial value, a force to displace the first end portion 24-1 in the upward direction acts. On the other hand, when the inclination angle θ of the first inclined portion 32-2 becomes larger than the initial value, a force to displace the first end portion 24-2 in the downward direction acts. In this way, the two first end portions 24 are subjected to forces to separate the connected portions from each other. The same applies to the second end portion 26-1 and the second end portion 26-2. The third embodiment prevents the two first end portions 24 from separating off and the two second end portions 26 from separating off.

[3-1. Configuration of Displacement Detection Device 10]

In the third embodiment, the detection unit 16 includes two fixing portions 40. One fixing portion 40 prevents the two first end portions 24 from being separated from each other. The other fixing portion 40 prevents the two second end portions 26 from being separated from each other. The two fixing portions 40 are the same in structure and operation. In the following description, the fixing portion 40 for preventing the two first end portions 24 from separating off will be described.

The fixing portion 40 includes a first fixing member 42, a second fixing member 44, and a plurality of fastening members 46. The first fixing member 42 and the second fixing member 44 are made of, for example, metal. Preferably, the first fixing member 42 and the second fixing member 44 are made of a metal harder than the plate member 20. The first fixing member 42 is larger than the first end portion 24-1. The first fixing member 42 is located upward of the first end portion 24-1 and is in contact with the first surface (upper surface) of the first end portion 24-1. The second fixing member 44 is larger than the first end portion 24-2. The second fixing member 44 is located downward of the first end portion 24-2 and is in contact with the first surface (lower surface) of the first end portion 24-2. The fastening member 46 is a bolt, a nut, a screw, or the like. The plurality of fastening members 46 fix four corners of the first fixing member 42 and the second fixing member 44. In this way, the fixing portion 40 fixes the two first end portions 24 to each other by sandwiching and pressing the two first end portions 24 against each other.

The first fixing member 42 and the second fixing member 44 do not necessarily need to sandwich the entire two first end portions 24. The first fixing member 42 and the second fixing member 44 may sandwich portions, of the two first end portions 24, that are adjacent to the two first inclined portions 32.

Further, the first fixing member 42 includes a first positioning portion 48. The first positioning portion 48 protrudes leftward. The second fixing member 44 includes two second positioning portions **50*a* and 50*b*. The two second positioning portions 50*a* and 50*b* protrude in the left direction and further extend in the upward direction. The second positioning portion 50*a* abuts on one end, in the width direction, of the first positioning portion 48. The second positioning portion 50*b* abuts on the other end of the first positioning portion 48 in the width direction. In this way, the first positioning portion 48 is sandwiched between the second positioning portion 50*a* and the second positioning portion 50*b*. Thus, the second fixing member 44 positions the first fixing member 42**.

Alternatively, the first positioning portion 48 may protrude in the width direction of the first fixing member 42. In this case, the two second positioning portions **50*a* and 50*b* also protrude in the same direction as the direction in which the first positioning portion 48 protrudes. Alternatively, instead of the two second positioning portions 50*a*, 50*b* extending in the upward direction, the first positioning portion 48 may extend in the downward direction. Alternatively, two first positioning portions 48 may be provided. In short, it is sufficient that a portion of the first fixing member 42 parallel to the up-down direction and a portion of the second fixing member 44 parallel to the up-down direction are brought into contact with each other, and as a result, the first fixing member 42 is positioned with respect to the second fixing member 44**.

[3-2. Operation and Effect of Displacement Detection Device 10]

In the third embodiment, the fixing portion 40 fixes the first end portion 24-1 and the first end portion 24-2 by pressing them against each other. Therefore, according to the third embodiment, the first end portion 24-1 and the first end portion 24-2 can be prevented from being separated from each other. Similarly, according to the third embodiment, the second end portion 26-1 and the second end portion 26-2 can be prevented from being separated from each other.

For screwing the first fixing member 42 to the second fixing member 44, a force to rotate the first fixing member 42 about an axis extending in the up-down direction acts on the first fixing member 42. As a result, the first fixing member 42 may be positionally shifted with respect to the first end portion 24. In contrast, in the third embodiment, the first fixing member 42 is positioned with respect to the second fixing member 44. That is, according to the third embodiment, it is possible to prevent the first fixing member 42 from being positionally shifted with respect to the first end portion 24.

4. Fourth Embodiment

Figure 8:
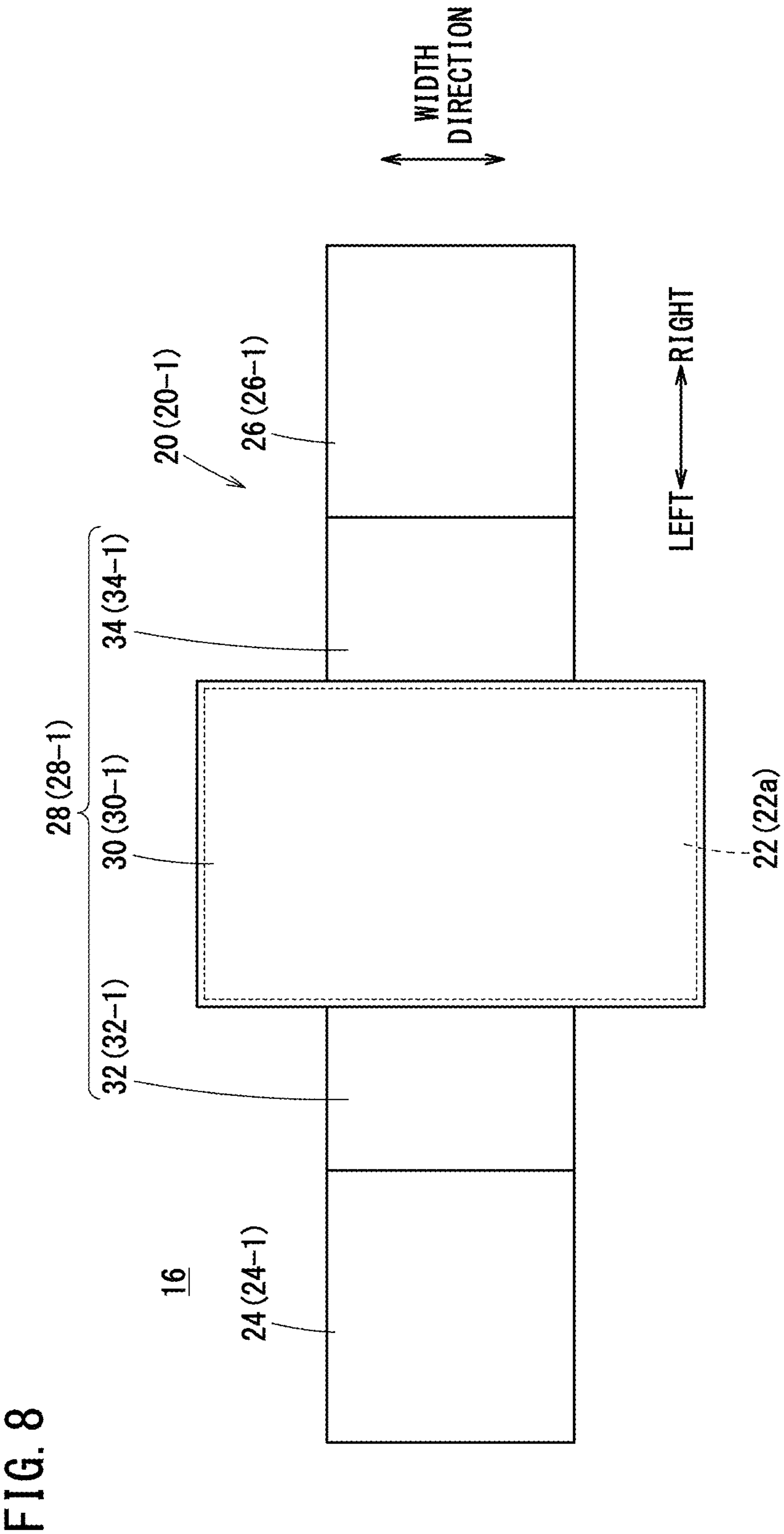
FIG. 8 is a top view of a detection unit according to a fourth embodiment.

A displacement detection device 10 of a fourth embodiment will be described with reference to FIG. 8. FIG. 8 is a top view of a detection unit 16 of the fourth embodiment. The displacement detection device 10 of the fourth embodiment is an improved example of the displacement detection device 10 of the first embodiment. The displacement detection device 10 of the fourth embodiment includes all the constituent elements of the displacement detection device 10 of the first embodiment. The operation of the displacement detection device 10 of the fourth embodiment is basically the same as the operation of the displacement detection device 10 of the first embodiment. In the description of the fourth embodiment, the same components as those of the first embodiment are denoted by the same reference numerals, and the description thereof will be omitted.

[4-1. Configuration of Displacement Detection Device 10]

In the fourth embodiment, the length of the holding portion 30 in the width direction is longer than the length, in the width direction, of each of the first end portion 24, the first inclined portion 32, the second inclined portion 34, and the second end portion 26. The length of each of the pair of opposing electrodes **22*a* and 22*b* in the width direction is also longer than the length, in the width direction, of each of the first end portion 24, the first inclined portion 32, the second inclined portion 34, and the second end portion 26. The length, in the width direction, of each of the holding portions 30 is equal to or larger than the length, in the width direction, of each of the opposing electrodes 22*a* and 22*b***.

[4-2. Operation and Effect of Displacement Detection Device 10]

As in the fourth embodiment, when the length of the holding portion 30 in the width direction is larger than the length of the other portion of the plate member 20 in the width direction, the pair of opposing electrodes 22*a*, 22*b* can be made longer in the width direction. Therefore, according to the fourth embodiment, the area of each of the pair of opposing electrodes 22*a*, 22*b* can be increased without changing the length of the detection unit 16 in the left-right direction. That is, according to the fourth embodiment, the sensitivity of detecting the displacement of the second member 14 can be increased.

5. Fifth Embodiment

Figure 9:
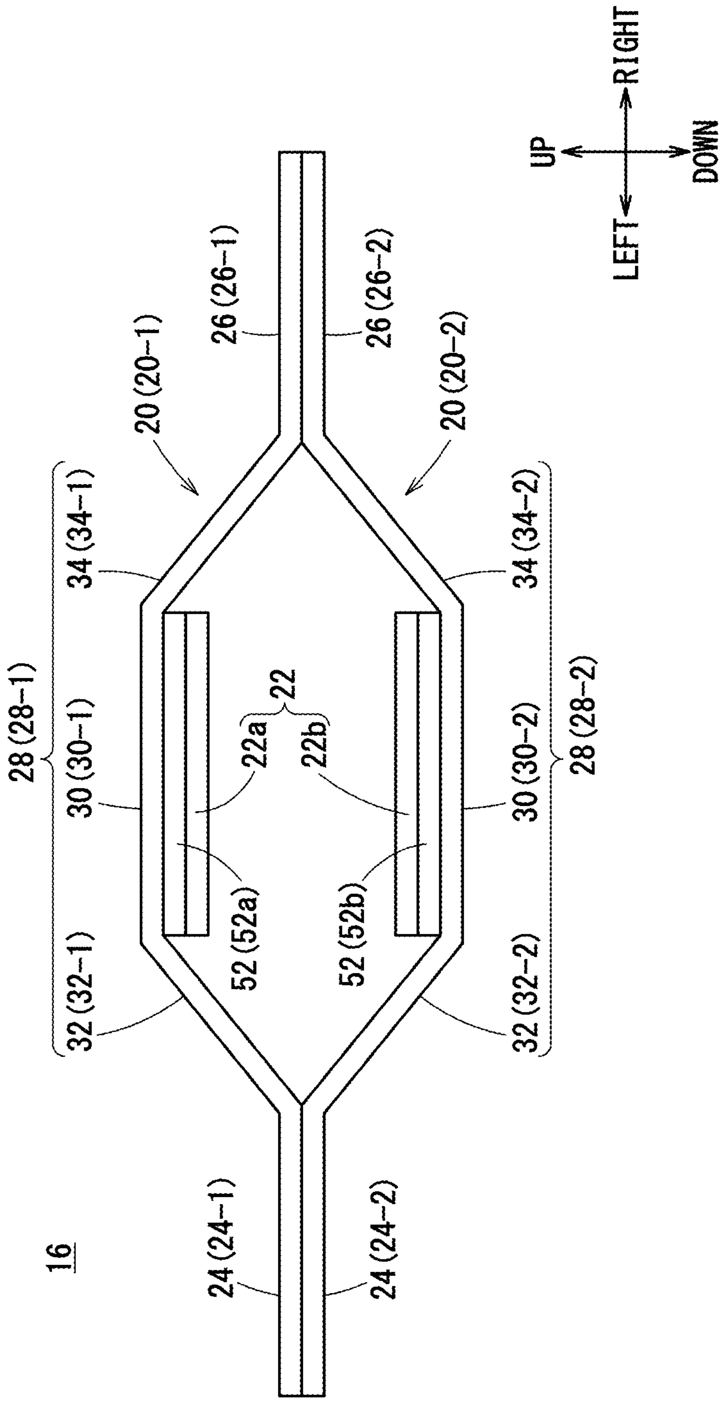
FIG. 9 is a front view of a detection unit according to a fifth embodiment.

A displacement detection device 10 of a fifth embodiment will be described with reference to FIG. 9. FIG. 9 is a front view of a detection unit 16 of the fifth embodiment. The displacement detection device 10 of the fifth embodiment is an improved example of the displacement detection device 10 of the first embodiment. The displacement detection device 10 of the fifth embodiment includes the constituent elements of the displacement detection device 10 of the first embodiment. The operation of the displacement detection device 10 of the fifth embodiment is basically the same as the operation of the displacement detection device 10 of the first embodiment. In the description of the fifth embodiment, the same components as those of the first embodiment are denoted by the same reference numerals, and the description thereof will be omitted.

External forces act on the displacement detection device 10 from various directions. The holding portion 30-1 is deformed by an unintended external force. For example, the holding portion 30-1 and the holding portion 30-2 may be deformed by an external force acting in a twisting direction. When the holding portion 30-1 and the holding portion 30-2 are deformed, the pair of opposing electrodes 22*a* and 22*b* are also deformed. Then, the gap G between the opposing electrodes 22*a* and 22*b* becomes non-uniform, and the accuracy of the sensor 22 decreases. The fifth embodiment prevents deformation of the pair of opposing electrodes 22*a* and 22*b*.

[5-1. Configuration of Displacement Detection Device 10]

In the fifth embodiment, the holding portion 30 (30-1, 30-2) is reinforced by a reinforcing plate 52 (52*a*, 52*b*). The reinforcing plate 52 is made of, for example, metal. Preferably, the reinforcing plate 52 is made of a metal harder than the plate member 20. The reinforcing plate 52*a* is attached to the second surface (lower surface) of the holding portion 30-1. The opposing electrode 22*a* is attached to the reinforcing plate 52*a*. The reinforcing plate 52*a* is in contact with the entire upper surface of the opposing electrode 22*a*. The opposing electrode 22*a* and the reinforcing plate 52*a* are insulated from each other. In this way, the reinforcing plate 52*a* is interposed between the holding portion 30-1 and the opposing electrode 22*a*. Similarly, the reinforcing plate 52*b* is interposed between the holding portion 30-2 and the opposing electrode 22*b*.

[5-2. Operation and Effect of Displacement Detection Device 10]

Each of the reinforcing plates 52 prevents deformation of each of the holding portions 30, thereby preventing deformation of the pair of opposing electrodes 22*a*, 22*b*. That is, according to the fifth embodiment, the gap G between the opposing electrodes 22*a* and 22*b* can be made uniform. Therefore, it is possible to prevent the accuracy of the sensor 22 from being lowered.

[5-3. Modification of Fifth Embodiment]

Figure 10:
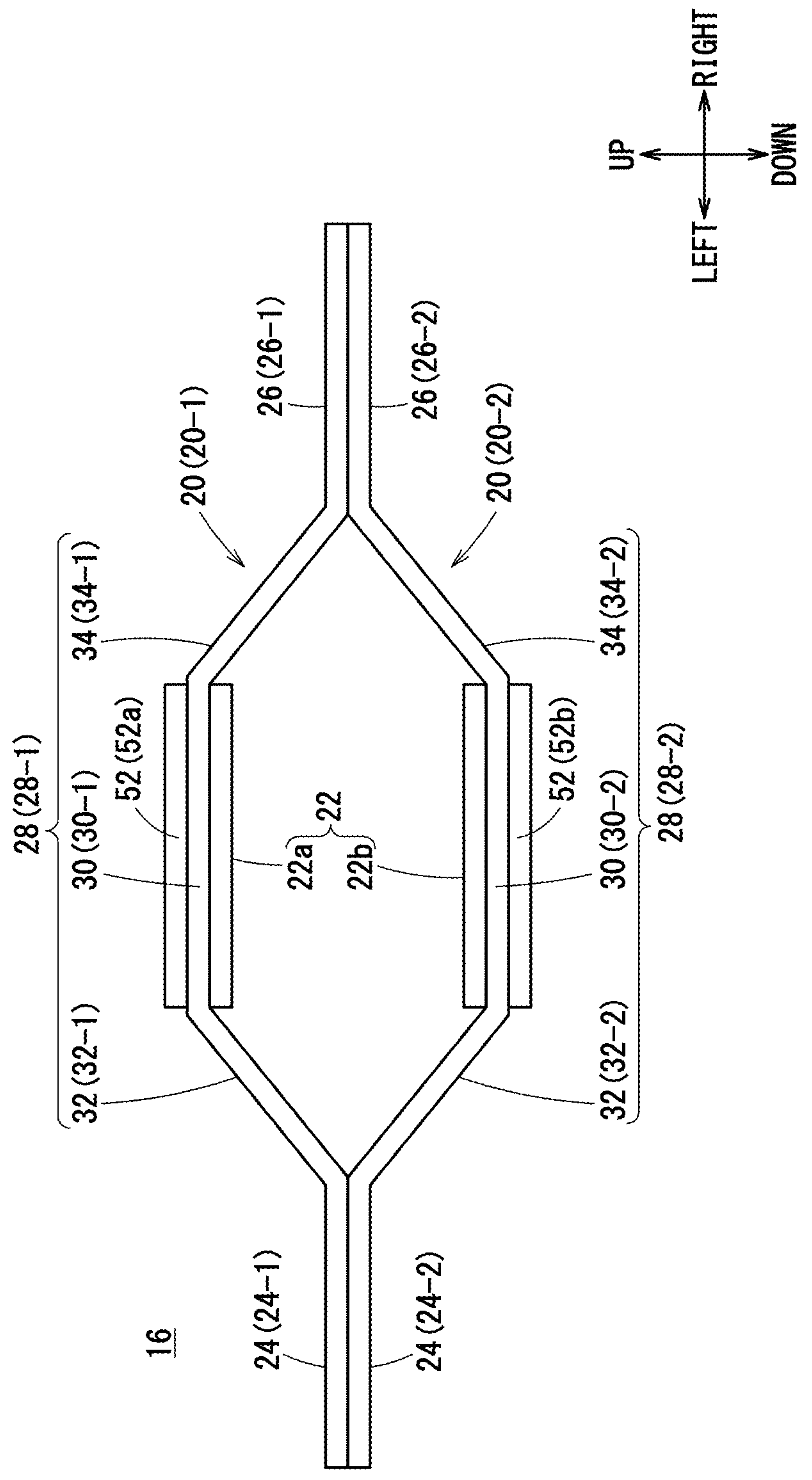
FIG. 10 is a front view of a detection unit according to a modification of the fifth embodiment.

FIG. 10 is a front view of a detection unit 16 according to a modification of the fifth embodiment. As shown in FIG. 10, the reinforcing plate 52 may be attached to the first surface (upper surface) of the holding portion 30. In other words, the reinforcing plate 52*a* may be attached to a surface (upper surface), of the holding portion 30-1, opposite to the surface (lower surface) to which the opposing electrode 22*a* is attached. In this case, the reinforcing plate 52*a* covers a range corresponding to the back side of a range in which the opposing electrode 22*a* is attached to the holding portion 30-1. The same applies to the reinforcing plate 52*b*.

6. Other Embodiments

One or more of the second to fifth embodiments may be combined.

7. Invention Obtained from Embodiments

The invention that can be grasped from the above embodiments is described below.

An aspect of the present invention is the displacement detection device (10) for detecting displacement of a second member (14) relative to the first member (12) in the predetermined direction, the displacement detection device including: the first plate member (20-1) configured to extend in the predetermined direction; the second plate member (20-2) configured to extend in the predetermined direction; and the sensor (22) configured to detect displacement, wherein both end portions of the first plate member and both end portions of the second plate member are connected to each other, each of the first plate member and the second plate member includes, as both the end portions, the first end portion (24) attached to the first member and the second end portion (26) attached to the second member, and further includes the intermediate portion (28) interposed between both the end portions, the gap (G) is formed between the intermediate portion of the first plate member and the intermediate portion of the second plate member, the sensor detects a change in the gap, and when the second member is displaced in the predetermined direction, the amount of the change in the gap is larger than the amount of displacement of the second member.

In the aspect of the present invention, each of the intermediate portion of the first plate member and the intermediate portion of the second plate member may include: the holding portion (30) configured to hold the sensor; the first inclined portion (32) located between the holding portion and the first end portion and inclined with respect to the predetermined direction; and the second inclined portion (34) located between the holding portion and the second end portion and inclined with respect to the predetermined direction.

In the aspect of the present invention, each of the first inclined portion and the second inclined portion may have one or more holes (36, 38).

In the aspect of the invention, each of the intermediate portion of the first plate member and the intermediate portion of the second plate member may include: the holding portion configured to hold the sensor; and the one or more holes formed in a portion other than the holding portion.

In the aspect of the present invention, the fixing portion (40) configured to fix the first end portion of the first plate member and the first end portion of the second plate member to each other may be further provided.

In the aspect of the present invention, the fixing portion may include the first fixing member (42) and the second fixing member (44) that are configured to sandwich and press the two first end portions against each other, and the second fixing member may position the first fixing member by being brought into contact with the first fixing member.

In the aspect of the invention, each of the intermediate portion of the first plate member and the intermediate portion of the second plate member may include: the holding portion configured to hold the sensor; the first inclined portion located between the holding portion and the first end portion and inclined with respect to the predetermined direction; and the second inclined portion located between the holding portion and the second end portion and inclined with respect to the predetermined direction, and the sensor may be a capacitive sensor whose capacitance value changes in accordance with a change in distance between the pair of opposing electrodes (22*a*, 22*b*), and the length of each of the opposing electrodes in the width direction orthogonal to the predetermined direction may be longer than the length of the first inclined portion and the length of the second inclined portion in the width direction.

In the aspect of the invention, each of the intermediate portion of the first plate member and the intermediate portion of the second plate member may include the holding portion configured to hold the sensor, the sensor may be a capacitive sensor whose capacitance value changes in accordance with a change in distance between the pair of opposing electrodes, and the holding portion may be reinforced by the reinforcing plate (52).

In the aspect of the invention, the reinforcing plate may be interposed between the holding portion and each of the opposing electrodes.

In the aspect of the invention, the reinforcing plate may be attached to the surface of the holding portion opposite to the surface thereof to which each of the opposing electrodes is attached.

REFERENCE SIGNS LIST

10: displacement detection device
12: first member
14: second member
20-1: first plate member
20-2: second plate member
22: sensor
22*a*, 22*b*: opposing electrode
24, 24-1, 24-2: first end portion
26, 26-1, 26-2: second end portion
28, 28-1, 28-2: intermediate portion
30, 30-1, 30-2: holding portion
32, 32-1, 32-2: first inclined portion
34, 34-1, 34-2: second inclined portion
36: first hole (hole)
38: second hole (hole)
40: fixing portion
42: first fixing member
44: second fixing member

The invention claimed is:

1. A displacement detection device for detecting displacement of a second member relative to a first member in a predetermined direction, the displacement detection device comprising:

a first plate member configured to extend in the predetermined direction;

a second plate member configured to extend in the predetermined direction; and a sensor configured to detect displacement, wherein the first plate member protrudes in a first direction orthogonal to the predetermined direction by being bent at least at four places, the second plate member protrudes in a second direction opposite to the first direction by being bent at least at four places, both end portions of the first plate member and both end portions of the second plate member are connected to each other, each of the first plate member and the second plate member includes, as both the end portions, a first end portion attached to the first member and a second end portion attached to the second member, and further includes an intermediate portion interposed between both the end portions, a gap is formed between the intermediate portion of the first plate member and the intermediate portion of the second plate member, the sensor detects a change in the gap, and when the second member is displaced in the predetermined direction, an amount of the change in the gap is larger than an amount of displacement of the second member.

2. The displacement detection device according to claim 1, wherein each of the intermediate portion of the first plate member and the intermediate portion of the second plate member includes:

a holding portion configured to hold the sensor;

a first inclined portion located between the holding portion and the first end portion and inclined with respect to the predetermined direction; and a second inclined portion located between the holding portion and the second end portion and inclined with respect to the predetermined direction.

3. The displacement detection device according to claim 2, wherein each of the first inclined portion and the second inclined portion has one or more holes.

4. The displacement detection device according to claim 1, wherein each of the intermediate portion of the first plate member and the intermediate portion of the second plate member includes:

a holding portion configured to hold the sensor; and one or more holes formed in a portion other than the holding portion.

5. The displacement detection device according to claim 1, further comprising:

a fixing portion configured to fix the first end portion of the first plate member and the first end portion of the second plate member to each other.

6. The displacement detection device according to claim 5, wherein the fixing portion includes a first fixing member and a second fixing member that are configured to sandwich and press the two first end portions against each other, and the second fixing member positions the first fixing member by being brought into contact with the first fixing member.

7. The displacement detection device according to claim 1, wherein each of the intermediate portion of the first plate member and the intermediate portion of the second plate member includes:

a holding portion configured to hold the sensor;

a first inclined portion located between the holding portion and the first end portion and inclined with respect to the predetermined direction; and a second inclined portion located between the holding portion and the second end portion and inclined with respect to the predetermined direction, and wherein the sensor is a capacitive sensor whose capacitance value changes in accordance with a change in distance between a pair of opposing electrodes, and a length of each of the opposing electrodes in a width direction orthogonal to the predetermined direction is longer than a length of the first inclined portion and a length of the second inclined portion in the width direction.

8. The displacement detection device according to claim 1, wherein each of the intermediate portion of the first plate member and the intermediate portion of the second plate member includes a holding portion configured to hold the sensor, the sensor is a capacitive sensor whose capacitance value changes in accordance with a change in distance between a pair of opposing electrodes, and the holding portion is reinforced by a reinforcing plate.

9. The displacement detection device according to claim 8, wherein the reinforcing plate is interposed between the holding portion and each of the opposing electrodes.

10. The displacement detection device according to claim 8, wherein the reinforcing plate is attached to a surface of the holding portion opposite to a surface of the holding portion to which each of the opposing electrodes is attached.

* * * * *